(12) United States Patent
Yoshida

(10) Patent No.: US 7,375,777 B2
(45) Date of Patent: May 20, 2008

(54) REFLECTION TYPE COLOR LIQUID CRYSTAL DISPLAY DEVICE HAVING SUB-PIXELS FOR INCREASING LUMINANCE, AND A LIGHT SCATTERING FILM INCLUDING COLOR FILTERS FOR THE SUB-PIXELS AND MANUFACTURING METHOD THEREOF

(75) Inventor: Kei Yoshida, Hyogo-ken (JP)

(73) Assignee: TPO Hong Kong Holding Limited, Shatin (HK)

( * ) Notice: Subject to any disclaimer, the term of this patent is extended or adjusted under 35 U.S.C. 154(b) by 0 days.

(21) Appl. No.: 11/091,634

(22) Filed: Mar. 28, 2005

(65) Prior Publication Data

US 2005/0168668 A1    Aug. 4, 2005

Related U.S. Application Data

(63) Continuation of application No. 09/743,837, filed on Jan. 16, 2001, now Pat. No. 6,950,156.

(51) Int. Cl.
   *G02F 1/1335*    (2006.01)
(52) U.S. Cl. ....................... 349/106; 349/114
(58) Field of Classification Search ................ 349/106, 349/108, 113, 114
   See application file for complete search history.

(56) References Cited

U.S. PATENT DOCUMENTS

| 4,892,391 A | 1/1990 | Stewart et al. |
| 5,548,425 A | 8/1996 | Adachi et al. |
| 5,642,176 A | 6/1997 | Abukawa et al. |
| 5,734,455 A | 3/1998 | Yoshida et al. |
| 5,734,457 A | 3/1998 | Mitsui et al. |
| 5,936,693 A | 8/1999 | Yoshida et al. |
| 5,963,284 A * | 10/1999 | Jones et al. ................. 349/112 |
| 6,016,178 A * | 1/2000 | Kataoka et al. ............. 349/117 |
| 6,084,650 A | 7/2000 | Sekiguchi |
| 6,278,508 B1 | 8/2001 | Ogawa et al. |
| 6,348,958 B1 | 2/2002 | Matsuoka et al. |
| 6,476,890 B1 | 11/2002 | Funahata et al. |

FOREIGN PATENT DOCUMENTS

| JP | 1-259396 A | 10/1989 |
| JP | 10-63203 A | 3/1998 |
| JP | 10154817 | 9/1998 |
| JP | 11295717 | 10/1999 |

* cited by examiner

*Primary Examiner*—James A. Dudek
(74) *Attorney, Agent, or Firm*—Birch, Stewart, Kolasch & Birch, LLP

(57) ABSTRACT

A reflective color display device having a color filter with portions for filtering or transmitting light components of a predetermined wavelength to increase luminance. At least portions of the color filter are integrated with a light scattering portion.

10 Claims, 3 Drawing Sheets

REFLECTION TYPE COLOR LIQUID CRYSTAL DISPLAY DEVICE HAVING SUB-PIXELS FOR INCREASING LUMINANCE, AND A LIGHT SCATTERING FILM INCLUDING COLOR FILTERS FOR THE SUB-PIXELS AND MANUFACTURING METHOD THEREOF

CROSS REFERENCE TO RELATED APPLICATION

This is a continuation of prior application Ser. No. 09/743,837 filed Jan. 16, 2001, and issued as U.S. Pat. No. 6,950,156.

FIELD OF THE INVENTION

The present invention relates to a reflection type color liquid crystal display device for displaying a color image by using extraneous light, and to a light scattering film capable of being used in the liquid crystal display device.

DESCRIPTION OF THE RELATED ART

Such a reflection type liquid crystal display device receives attention because it is expected to have lower power consumption and to be miniaturized. The publicly known example includes a reflection type liquid crystal display device disclosed in Japanese Patent Laid-Open No. 154817/98.

This publication discloses the structure of a display panel which, although using only one polarizing plate as polarizing means, makes it possible to obtain a high quality image and bright display.

In the publicly known display panel, unit pixels each consisting of three sub-pixels corresponding to primary colors such as R(red), G(green) and B(blue) are arranged so as to form an image. To this end, the display panel is provided with R, G and B color filters in correspondence with the sub-pixels.

However, to obtain a brighter display in an arrangement having such color filters of R, G and B sub-pixels, it is often necessary to resort to, e.g., a measure which will disadvantageously lead to degradation of color purity of the color filters.

Further, generally, to provide products at a cheap price are important whether the products are reflection type or transmission type. Therefore, when making a structure enabling a brighter display, it is also necessary to pay close attention to the cost performance of manufacture.

SUMMARY OF THE INVENTION

In view of the above, a main object of the present invention is to provide a liquid crystal display device capable of increasing the luminance of display without decreasing the color purity.

Another object of this invention is to provide a light scattering film capable of reducing or saving the cost without heavily burdening the manufacturing process while ensuring the above object, and a method of manufacture thereof.

To achieve the above-mentioned main object, one aspect of the present invention is a reflection type color liquid crystal display device for displaying a color image formed based on unit pixels each comprising sub-pixels corresponding to primary colors by using extraneous light, which comprises: a liquid crystal layer varying a state of light transmitted therethrough in accordance with electric field applied thereacross; a reflection layer reflecting light which is incident thereon via the liquid crystal layer; transparent electrode layer and pixel electrode layer for applying electric field to the liquid crystal layer for each of the sub-pixels in accordance with an image to be displayed, the transparent layer located on a side of one main surface of the liquid crystal layer on which extraneous light is incident, the pixel electrode layer located on a side of another surface of the liquid crystal layer on which light reflected from the reflection layer is incident; and a color filter layer comprising portions which perform coloring of the primary colors for the light to be transmitted (or the light having transmitted) through the liquid crystal layer in correspondence with the sub-pixels, characterized in that: the unit pixel further comprises a sub-pixel for increasing luminance; and the color filter layer further comprises additional portions associated with the sub-pixels for increasing luminance, the additional portion transmitting light components of predetermined wave-lengths from the light to be transmitted (or the light having transmitted) through the liquid crystal layer.

In this device, the color filter may be located on a side of the one main surface on which extraneous light is incident, or the color filter may be located on a side of another surface of the liquid crystal layer on which light reflected from the reflection layer is incident.

The light components of predetermined wave-lengths may be white light.

Further, the reflection layer and pixel electrode layer may be in the same layer and in common.

To achieve the other object mentioned above, another aspect of the present invention is a light scattering film capable of being used in a liquid crystal device for displaying a color image on the basis of unit pixels comprising sub-pixels corresponding to primary colors, characterized in that the film comprises: portions performing coloring of the primary colors for light transmitted thereof for each of the sub-pixels; additional portions associated with sub-pixels for increasing luminance, the additional portions transmitting light components of predetermined wave-lengths from light incident thereon; and a light scattering portion being extended over the whole of the film, and in that the additional portions and the light scattering portion are integrally formed from the same material.

In this film, the light components of predetermined wave-lengths may be white light.

To achieve the similar objects to the above, a still further aspect of the present invention is a method of manufacturing a light scattering film capable of being used in a liquid crystal display device for displaying a color image on the basis of unit pixels comprising sub-pixels corresponding to primary colors, characterized in that the method comprises: a preceding step of forming coloring portions on a support member while forming spaces for additional portions which are associated with sub-pixels for increasing luminance and which transmits light components of predetermined wave-lengths from light incident thereon, the coloring portions performing coloring of the primary colors for light transmitted thereof for each of the sub-pixels; and a succeeding step of filling the space and forming a light scattering portion extended over the whole of the film, with the same material which can be characteristic of transmitting the light components of predetermined wave-lengths.

The support member may be a transparent substrate located on a front side of a display screen in the liquid crystal display device, or it may be a transparent substrate which is located on a rear side of a display screen in the liquid crystal display device and on which a layer of driving element array and a reflection layer are stacked, the coloring portions and the additional portions being formed on the reflection layer.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
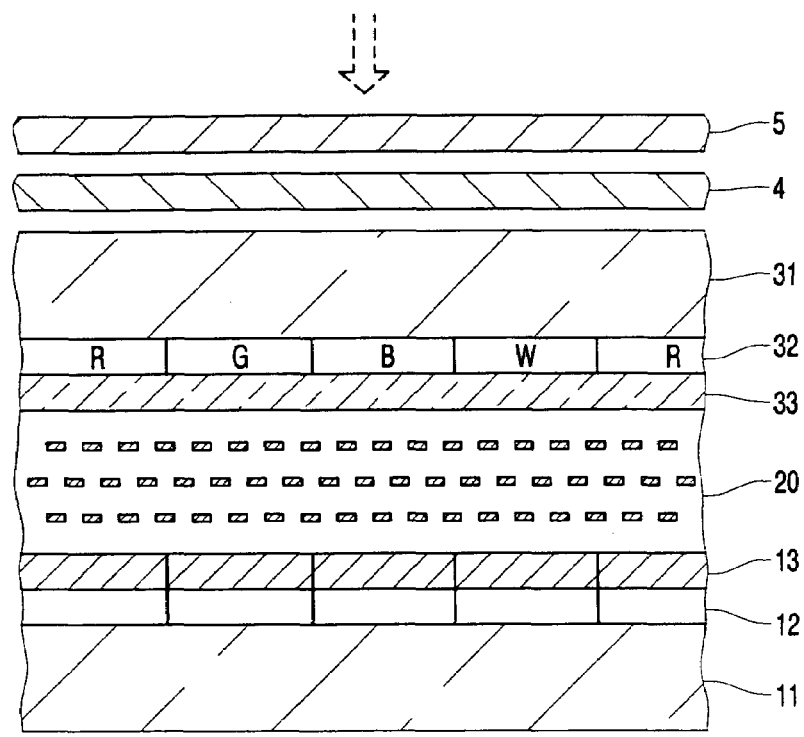
FIG. 1 is a sectional view of the structure of the display panel of the color liquid crystal display device representing an embodiment of the invention.

FIG. 1 shows a sectional view of the structure of a display panel of a color liquid crystal display device according to one embodiment of the invention.

In this figure, a first transparent glass substrate 11 is located on a side of the rear surface of the display panel, and carries thin-film transistors (TFTs) 12 as a layer of an array of liquid crystal driving elements. The TFTs 12 are provided for each sub-pixel, the respective drains of which the TFTs are connected to pixel electrodes within a reflection layer 13, the electrodes each having an area formed for each sub-pixel. Therefore, the reflection layer 13 is in common with the so-called pixel electrode layer. The pixel electrode is composed of substances having adequate electrical conductivity and light reflectivity such as aluminum. Thus the pixel electrodes have a function of reflecting the extraneous light which is incident thereupon through the display panel towards the front side of the display panel, while acting as one-side electrodes through which an electric field is applied to the liquid crystal layer 20 for each of the sub-pixels. In the fabrication process, the glass substrate 11 serves as a base for the formation of the TFTs 12 and reflection layer 13.

Towards the front side of the display panel, a second transparent glass plate 31 is placed. The second glass plate 31 carries a color filter layer 32 on a side towards the rear side of the display panel. The color filter layer 32 is divided into portions in correspondence with the sub-pixels, and for each of the portions is allotted an appropriate optical filter part for coloring (or transmitting all light components) R, G, B or W(white). Therefore, the color filter 32 has not only portions for performing coloring of the primary colors such as R, G and B as in the conventional device, but also additional portions for filtering or transmitting light components of predetermined wave-lengths or W (white light), while the TFTs 12 and the pixel electrodes in the reflection layer 13 both are placed not only in correspondence with the R, G and B sub-pixels, but also in correspondence with the W sub-pixels. The filter portions corresponding to the W sub-pixels may be made, for example, of an acrylic resin.

The color filter layer 32 has a common electrode 33 formed over its entire surface of a side towards the rear surface of the display panel. The common electrode 33 is made of a substance having adequate electrical conductivity and light transparency such as ITO (indium tin oxide), has a function of transmitting the light which is incident on it from outside of the display panel to the liquid crystal layer 20, and serves as the other electrode through which an electric field is applied to the liquid crystal layer 20 for the respective sub-pixels. In the fabrication process, the glass substrate 31 serves as a base for the formation of the color filter layer 32 and common electrode 33.

The material for the liquid crystal layer 20 is introduced into a gap formed between an assembly of the glass substrate 11, the TFTs 12 and the reflection layer 13 on one side of the display panel, and another assembly of the glass substrate 31, the color filter 32 and the common electrode 33 on the other side of the display panel. The material is sealed there with sealing members (not shown). Bonding together the two assemblies having the constitutions as described above and sealing-in of the liquid crystal material make a body of the display panel finished.

To the glass substrate 31 of the display panel body thus obtained, a polarizing plate 4 is attached on its surface towards the front side of the display panel. The polarizing plate 4 is provided so as to transmit only predetermined polarized light components of the extraneous light to the liquid crystal layer 20, and to allow only predetermined polarized light components of the reflected light modulated by the liquid crystal layer 20 to be displayed as an image.

Further, a light scattering film 5 is applied onto the front face of the polarizing plate 4. The light scattering film 5 is introduced to give a display with a wide viewing angle. To this end, for example, it has microscopic asperities on its surface to scatter the light.

The pixel electrodes in the reflection layer 13 and the common electrode 33 face to each other via the liquid crystal layer 20, so that a local electric field can be applied to the liquid crystal layer 20 for each sub-pixel in accordance with an image to be displayed.

In this embodiment, since four sub-pixels of R, G, B and W constitute a unit pixel, a W sub-pixel can be used to increase the brightness of the unit pixel independently of R, G and B sub-pixels which are involved in performing the coloring of primary colors. By the W sub-pixels, it becomes possible for extraneous light to be substantially totally reflected, whereby the displayable range of luminance is extended upwards. Thus it becomes possible to obtain a bright display without sacrificing the color purity on account of it.

Figure 2:
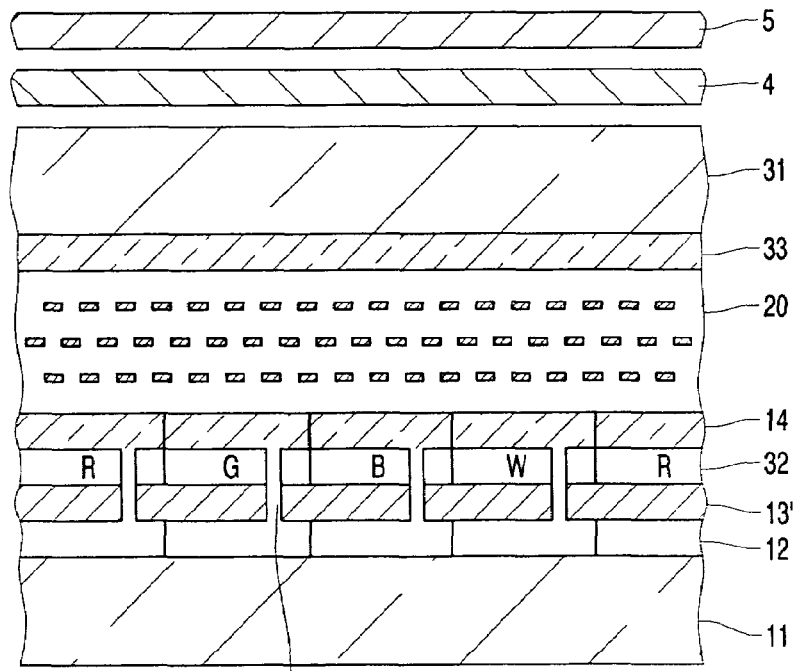
FIG. 2 is a sectional view of the structure of the display panel of the liquid crystal display device representing another embodiment of the invention.

FIG. 2 shows a sectional view of the structure of the display panel in the liquid crystal display device according to another embodiment of the invention. The parts equivalent in function to those of FIG. 1 are given the same symbols.

In contrast with the foregoing embodiment, the color filter layer 32 is placed on the side of the first glass substrate 11, instead of the color filter layer 32 having been on the side of the second glass substrate 31. To put it more specifically, the reflection layer 13' is given only a function of reflecting light while excluding a function of serving as pixel electrodes; on this reflection layer 13' is placed the color filter layer 32; and the common electrode 33 is directly layered onto the glass plate 31. Further, a layer 14 of transparent pixel electrodes is formed on the color filter layer 32, which is made of ITO. For this arrangement, conductive passages 14p are formed across the color filter layer 32 and the reflection layer 13' to connect the drains of the TFTs 12 with the respective electrodes of the pixel electrode layer 14. Even with such a constitution where the color filter layer is placed towards the rear side of the display panel, it is obviously possible to obtain the same advantage as in the foregoing embodiment by virtue of the introduction of the W sub-pixels.

Figure 3:
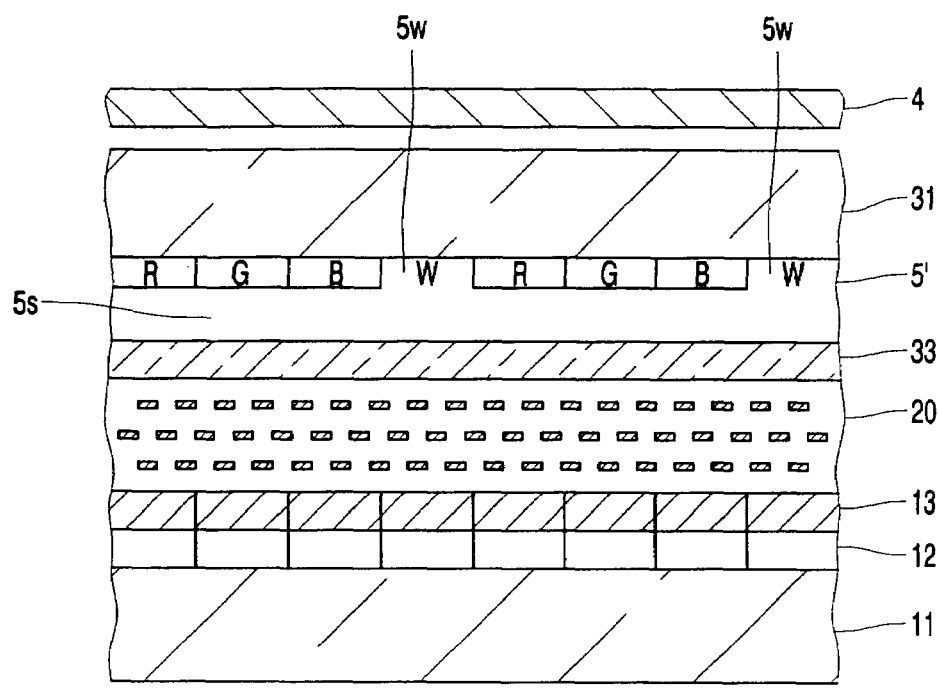
FIG. 3 is a sectional view of the structure of the display panel of the liquid crystal display device incorporating a light scattering film according to an embodiment of the invention.

FIG. 3 gives a sectional view of the structure of a light scattering film and a display panel in the liquid crystal display device incorporating a light scattering film according to a still further embodiment of the invention. The parts equivalent in function to those of FIG. 1 are given the same symbols.

Referring to FIG. 3, between the second glass substrate 31 and the common electrode 33 a layer 5' is inserted, which has both a function of the above-mentioned color filter 32 and a function of the above-mentioned light scattering film 5. To put it more specifically, in the layer 5', color filter portions 5w are provided for W sub-pixels to increase brightness, and a layer portion 5s is provided for forming a primary surface of a light scattering film. Here, the color filter portions 5w and the layer portion 5s are formed integrally from the same material. In other words, a light scattering film 5' incorporating color filters for W sub-pixels is introduced.

With this constitution, it becomes possible not only to obviate the need for a light scattering film introduced outside the display panel body, but also to form the light scattering portion 5s of the film 5' and its additional portion 5w at the same time (or by the same process). This results in reduction of the burden of process caused by the addition of the W sub-pixels. The fabrication process of the film 5' will be described later.

Figure 4:
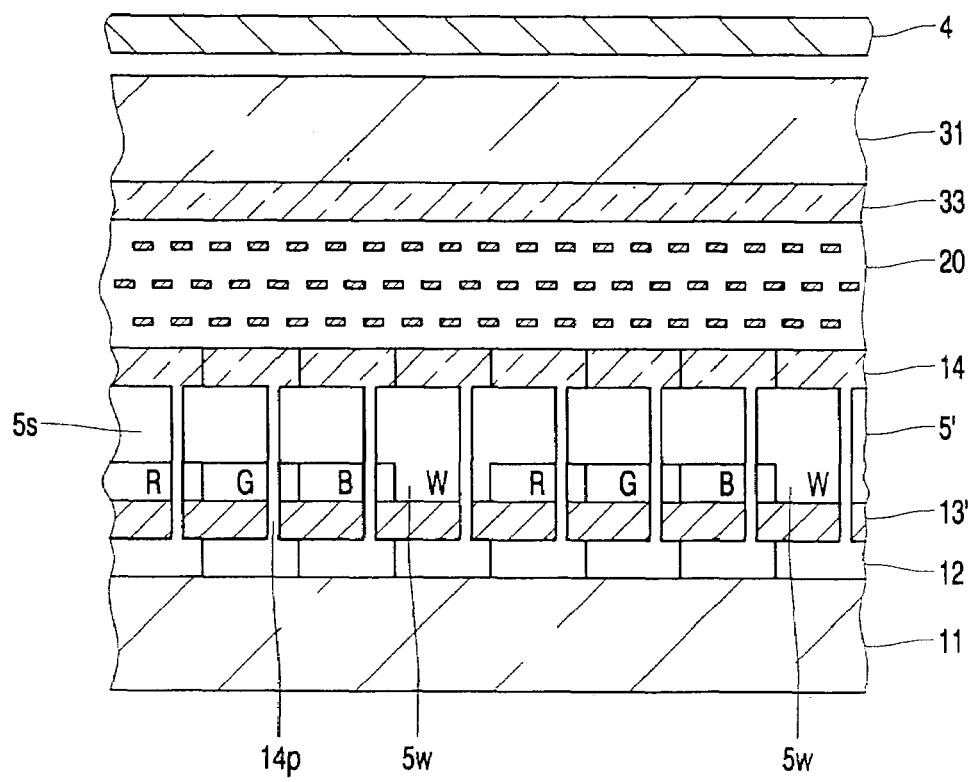
FIG. 4 is a sectional view of the structure of the display panel of the liquid crystal display device incorporating a scattering film according to the other embodiment of the invention.

FIG. 4 gives a sectional view of the structure of display panel in the liquid crystal display device using a light scattering film according to a still further embodiment of the invention. The parts equivalent in function to those of FIG. 3 are given the same symbols.

This embodiment, in contrast to the construction represented in FIG. 3, has the film 5' formed towards the rear side of the display panel. Accordingly, film 5' is formed on the reflection layer 13, and the common electrode 33 is directly laminated onto the glass substrate 31.

Figure 5:
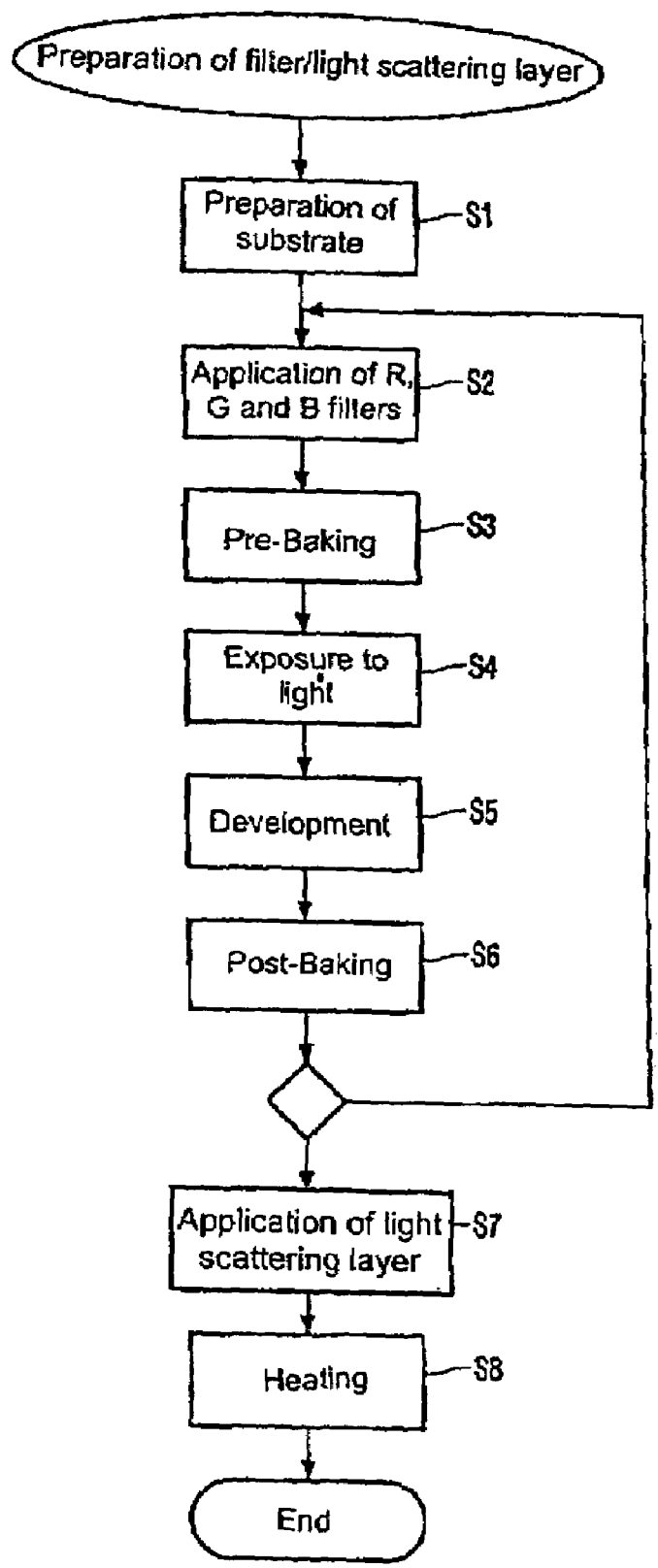
FIG. 5 is a process flowchart showing the steps of fabricating a light scattering film in accordance with the invention.

FIG. 5 gives an example of the fabrication process of the light scattering film 5' according to the invention which has been described above with reference to FIG. 3.

The series of steps represented in the figure starts from preparing a second glass substrate 31 to serve as a supporting member for the film (step S1). The next step consists of a step of applying a liquid light sensitive resin (photoresist) which can serve as a color filter for the n-th color (e.g., R) uniformly over the main surface of the prepared glass substrate 31 (step S2). Then, the resultant substrate is subjected to a pre-baking process based on a heating step whereby the solvent of the liquid light sensitive resin is evaporated to somewhat harden the resin (step S3).

Following step S3, masking is applied to the resin such that resin portions to be remained on the glass substrate 31 are left exposed while the other unnecessary resin portions are masked, and the substrate with the masked resin is exposed to light to allow the necessary portions to be selectively exposed to light (step S4). After that, the resin portions not exposed to light being shielded by the mask are dissolved by a specified solvent for removal (step S5).

The resin portions, exposed to light because of its being left unmasked, do not dissolve in the solvent, and are left on the glass substrate 31. These resin portions are subjected to a post-baking process based on a heating step whereby sufficient hardening is achieved (step S6). The resin portions thus left on the glass substrate 31 form color filter portions for the n-th color.

Following step S6, the same treatment as done in the steps S2 to S6 is repeated to produce color filter portions for the (n+1)-th color (e.g., G). The same treatment as done in the steps S2 to S6 is further repeated to produce color filter portions for the (n+2)-th color (e.g., B). When those steps are completed for the manufacture of R, G and B filter portions, as seen from FIG. 3 giving the structure of film 5', locations for the filter portions of W have recesses or voids.

After the completion of the manufacture of R, G and B filter portions, in order to form the W color filter portions and the light scattering layer 5', a liquid thermosetting resin (e.g., acrylic resin) appropriate for formation of such structural elements is applied over the whole of the main surface of the glass substrate so as to not only fill the recesses for W color filter portions with itself, but also to coat the R, G and B color filter portions (step S7). Then, the obtained assembly is subjected to heating treatment for hardening (step S8), to finish a film 5' as shown in FIG. 3.

After manufacture of the film 5', the process proceeds to manufacture of the common electrode 33.

Steps S7 and S8 make it possible to form the W color filter portions 5w and the light scattering layer portion 5s almost at the same time in a single process, and thus to prevent the addition of the W sub-pixels from imposing an extra burden on the fabrication process.

It should be noted that in FIGS. 1 to 4, constitutive elements used in practice such as an orientation or alignment layer attached to the liquid crystal layer 20 are omitted for clarity. Further, it will be obvious to those skilled in the art to, as appropriate, add to the embodiments the other constitutive elements that have not been mentioned above, or to modify the constitutive elements of the embodiments, within the range of matter of design variation.

Further, in the above embodiments, no mention was given of the types of liquid crystal material applicable to the liquid crystal layer 20, or whether a retardation plate as described in the aforementioned publication should be introduced or not. However, needless to say, such publicly known techniques can be applied to this invention without departing from the scope of the invention as defined in the attached Claims.

Furthermore, in the above-mentioned embodiments, white is selected as the display color of the sub-pixels for increasing luminance, but any other color may be used in the invention. For example, white may be substituted for green or cyan. Still further, all the four colors assigned to the sub-pixels may be changed. The four colors may be substituted, for example, for yellow, cyan, magenta and white. In short, the color assigned to an additional sub-pixel for enhancing brightness may be determined as appropriate according to the primary colors employed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE NUMERALS

11: First glass substrate
12: TFT
13,13': Reflection layer
20: Liquid crystal layer
31: Glass substrate
32: Color filter layer
14: Pixel electrode
14p: Electrically conductor
33: Common electrode
4: Polarizing plate
5,5': Light scattering film
5w: Color filter portion for W sub-pixel
5s: Predominant portion of light scattering film Translation of the Drawings
FIG. 1
(dotted arrow): Extraneous light
FIG. 5
( ): Preparation of filter/light scattering layer
S1: Preparation of substrate
S2: Application of R, G and B filters
S3: Pre-baking
S4: Exposure to light
S5: Development
S6: Post-baking
S7: Application of light scattering layer
S8: Heating
( ): End

The invention claimed is:

1. A reflection type color liquid crystal display device for displaying a color image formed based on unit pixels each comprising sub-pixels corresponding to primary colors by using extraneous light, which comprises:
a liquid crystal layer varying a state of light transmitted therethrough in accordance with electric field applied thereacross;
a reflection layer reflecting light which is incident thereon via the liquid crystal layer;
transparent electrode layer and pixel electrode layer for applying electric field to the liquid crystal layer for each of the sub-pixels in accordance with an image to be displayed, the transparent layer located on a side of one main surface of the liquid crystal layer on which extraneous light is incident, the pixel electrode layer located on a side of another surface of the liquid crystal layer on which light reflected from the reflection layer is incident; and
a color filter layer being divided into at least two portions, each portion in correspondence with the subpixels and having an appropriate optical filter part for coloring (or transmitting all light components), wherein at least one portion performs coloring for the primary colors and at least one additional portion filters or transmits light components of predetermined wavelengths,
wherein the at least one additional portion is integrated with a light scattering film,
wherein the at least one additional portion and the light scattering film are integrally formed from the same material.

2. A device as claimed in claim 1, wherein the color filter layer is located on a side of the one main surface on which extraneous light is incident.

3. A device as claimed in claim 1, wherein the color filter layer is located on a side of another surface of the liquid crystal layer on which light reflected from the reflection layer is incident.

4. A device as claimed in claim 1, wherein the light components of predetermined wave-lengths are white light.

5. A device as claimed in claim 1, wherein the reflection layer and pixel electrode layer are in the same layer and in common.

6. The device of claim 2, wherein the light components of predetermined wavelengths are white light.

7. The device of claim 3, wherein the light components of predetermined wavelengths are white light.

8. The device of claim 2, wherein the reflection layer and the pixel electrode layer are in the same layer and in common.

9. The device of claim 3, wherein the reflection layer and the pixel electrode layer are in the same layer and in common.

10. The device of claim 4, wherein the reflection layer and the pixel electrode layer are in the same layer and in common.

* * * * *